(12) United States Patent
Nielsen

(10) Patent No.: US 7,066,041 B2
(45) Date of Patent: Jun. 27, 2006

(54) LINEAR ACTUATOR

(75) Inventor: Jens Jørgen Nielsen, Broager (DK)

(73) Assignee: Linak A/S, Nordborg (DK)

( * ) Notice: Subject to any disclaimer, the term of this patent is extended or adjusted under 35 U.S.C. 154(b) by 141 days.

(21) Appl. No.: 10/380,665

(22) PCT Filed: Oct. 3, 2001

(86) PCT No.: PCT/DK01/00644

§ 371 (c)(1),
(2), (4) Date: Mar. 18, 2003

(87) PCT Pub. No.: WO02/29284

PCT Pub. Date: Apr. 11, 2002

(65) Prior Publication Data

US 2004/0093969 A1    May 20, 2004

(30) Foreign Application Priority Data

Oct. 3, 2000    (DK) ............................... 2000 01466

(51) Int. Cl.
*F16H 27/02*    (2006.01)

(52) U.S. Cl. ........................ 74/89.35; 74/89.38; 74/425

(58) Field of Classification Search ............... 74/89.35, 74/89.38, 425, 89.23, 89.39, 424.71
See application file for complete search history.

(56) References Cited

U.S. PATENT DOCUMENTS

| 2,398,841 | A |   | 4/1946  | Morris |   |
|---|---|---|---|---|---|
| 2,441,505 | A | * | 5/1948  | Ochtman | ...................... 477/10 |
| 2,660,281 | A | * | 11/1953 | Ochtman | ...................... 192/141 |
| 3,038,352 | A | * | 6/1962  | Murphy  | .......................... 475/2 |
| 3,751,998 | A | * | 8/1973  | Vasilatos | .................... 74/89.24 |
| 4,062,075 | A | * | 12/1977 | Stern et al. | ..................... 5/611 |
| 4,858,481 | A | * | 8/1989  | Abraham | .................... 74/89.38 |
| 5,809,833 | A |   | 9/1998  | Newport et al. |   |
| 5,865,272 | A | * | 2/1999  | Wiggins et al. | ........... 185/40 R |
| 6,109,124 | A | * | 8/2000  | Chen | ......................... 74/89.36 |
| 6,158,295 | A | * | 12/2000 | Nielsen | ..................... 74/89.38 |
| 6,240,800 | B1 |   | 6/2001  | Bokamper et al. |   |
| 6,259,175 | B1 | * | 7/2001  | Alfano et al. | .................. 310/20 |

FOREIGN PATENT DOCUMENTS

| EP | 968675       |   | 1/2003  |
|----|--------------|---|---------|
| FR | 2715253      |   | 7/1995  |
| JP | A 60 245870  | * | 12/1985 |
| JP | A 62 8459    | * | 1/1987  |
| JP | A 63 195144  | * | 12/1988 |
| JP | A 64 29790   | * | 2/1989  |
| JP | A 6 56550    | * | 8/1994  |
| JP | A 7 30573    | * | 6/1995  |
| JP | A 2000 152557| * | 5/2000  |

* cited by examiner

Primary Examiner—David M. Fenstermacher
(74) Attorney, Agent, or Firm—Dykema Gossett PLLC

(57) ABSTRACT

A linear actuator useful for adjusting furniture includes a housing (1) with a reversible electric-motor (2) which, via a transmission (11, 13), drives a spindle (4) with a force absorbing bearing (16). On the spindle there is a nut (5) to which an actuation rod (86) is fixed surrounded by an outer tube (7). The actuator is with the actuation rod and a rear mounting mounted in the construction into which the actuator should be built-in. The motor housing is part of the supporting construction, as a console is fixed to this (10) with a fixing for the outer tube, spindle bearing and a rear mounting and is designed to absorb the forces occurring hereon. As the housing, as with previously known actuators, need not absorb and transfer forces, this can be made as a thin shell.

12 Claims, 7 Drawing Sheets

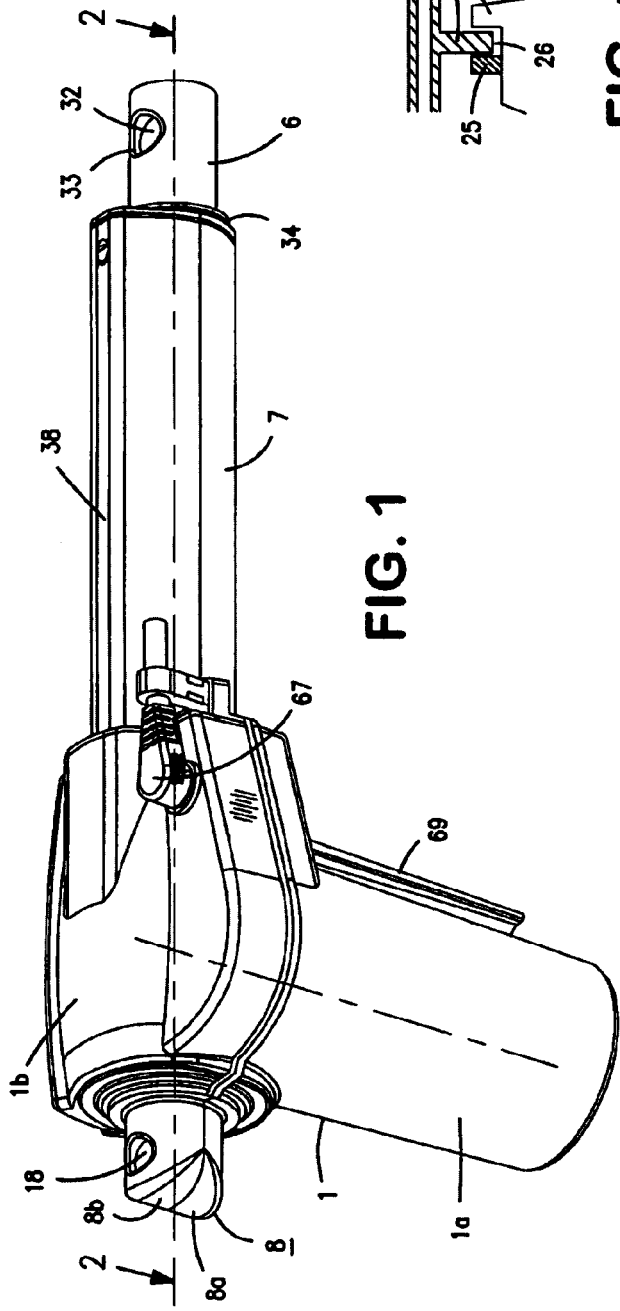
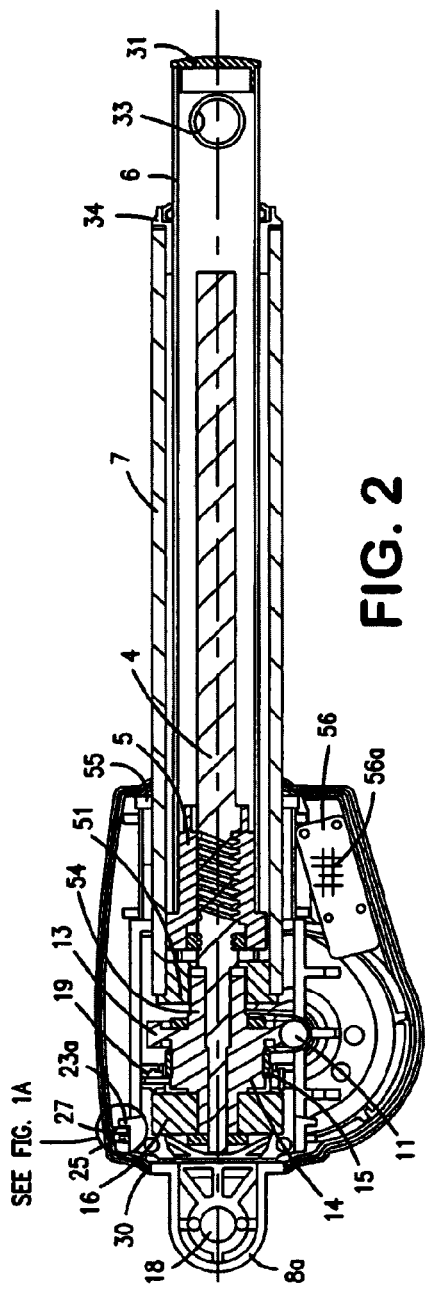

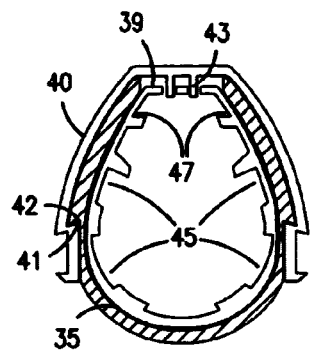
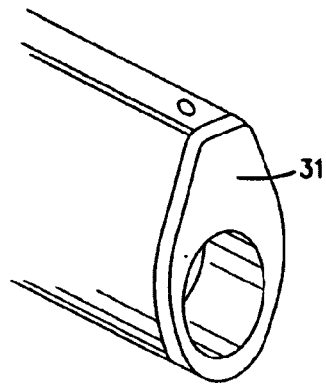
FIG. 6  FIG. 7
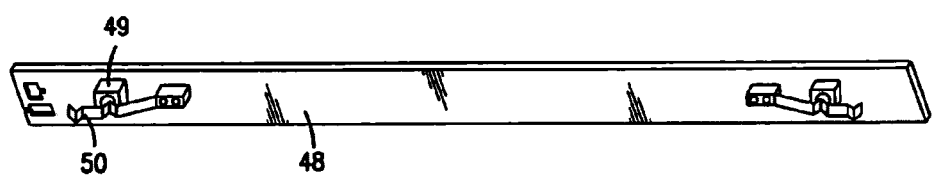
FIG. 8

LINEAR ACTUATOR

BACKGROUND OF THE INVENTION

1. Field of the Invention

The present invention relates to linear actuators.

2. The Prior Art

Linear actuators are for example known from EP 531 247 A1, EP 586 326 A1, EP 647 799 and EP 662 573 A1 all belonging to Linak A/S. The forces occurring on the spindle are absorbed by a push/pull bearing encapsulated in a plastic housing. The forces occurring between the bearing and the rear mounting are transferred through the plastic housing and the housing must be dimensioned and designed accordingly. Such a plastic housing constitutes a considerable amount of the actuators price. From WO 98/30816 Linak A/S a sophisticated actuator with a very high performance is disclosed where the forces between the bearing and the rear mounting are transferred via a metal chassis. These actuators are amongst others used in furniture, for example, in hospital and care beds, where is a requirement that the actuators are damp and waterproof. As an example, see EP 488 552 A1 Huntleigh Technology plc. As the actuators are completely or partly visible, it is additionally a requirement that the actuators have a minimum of design with smooth and dirt-resistant surfaces.

A designless heavy duty actuator without a housing for industrial purposes is based on a supporting metal housing with integrated rear mounting, where the forces are transferred through this.

An actuator of this type is disclosed in DE GM 94 04 383.3 U1, where the housing, which is of pressure die cast zinc, is formed with a cylindrical portion for the motor, the cylindrical part can be closed with a cover. In addition, the actuator is waterproof, with suitable sealing, such that it can be used for beds within the hospital and care sector. The pressure die cast zinc housing, which must be relatively large because it has to include the motor, makes it a relatively expensive solution.

From EP 0 831 250 A2 is known an actuator with a housing. The housing includes a shell, which surrounds the motor and gearing. The shell, which is open to the rear that is towards the rear mounting of the actuator, is closed with a cover. To the front that is to towards the spindle, the shell is shaped with a fixing for the outer tube, said outer tube acting as a guide for the spindle nut and as a guide for the outer end of the spindle. The transversal forces, which in any case occur on the spindle, are transferred via the outer tube to the housing. It is accordingly stated that the housing and the outer tube are made of a rigid material and as an example are amongst others specified aluminum, zinc alloys and stainless steel, that is to say the specified plastic material, glass fibers containing nylon, polyvinyl chloride and polyethylene have an equivalent rigidness. On the whole a relatively expensive solution.

The purpose of the invention is to provide an actuator of the type first mentioned, which is cheap to produce, but in terms of performance and quality is equal to these.

SUMMARY OF THE INVENTION

According to the invention this is achieved by designing the actuator such that the console on the motor housing has an additional fixing for the outer tube, spindle bearing and the rear mounting, and designed to absorb the forces occurring hereon. The console can be designed only with regard to transferring the forces between the bearing and the rear mounting and otherwise made so compact as possible. Accordingly, the motor housing and the console are the supporting parts of the actuator, in other words the chassis. As there are no special demands to the strength of the housing one is freer with regard to the production and the shape of the housing. Therefore the material thickness can be thin, and strengthening ribs can generally be completely avoided which means simpler moulding tools and easier production. Additionally, plastic types of a lower strength can be chosen which is in itself cheaper, but also a production advantage.

The known actuators are typically assembled with screws, which necessitates the moulding of screw wells and screw towers in the housing and the actual assembly is made manually. As the housing according to the invention is not part of the supporting structure this allows the possibility for the use of other not force transferring methods of assembly. According to an embodiment of the invention the housing is assembled by welding, preferably by ultrasonic welding. This is done by machine, reducing the manual assembly. Additionally, a complete welding makes the housing damp and waterproof, thereby avoiding a labyrinth sealing as with the known actuators. The joining edges can therefore be made more simply and at the same time a manual fitting of a seal is avoided.

The housing of the known actuators is two-pieced on a plane determined by the longitudinal axis of the spindle and parallel with the motor axle.

In contrast, according to the invention the housing is two-pieced on a plane determined by the longitudinal axis of the spindle and at a right angle to the motor axle, or generally in this position. This gives assembly advantages, especially when the housing in addition is shaped with a cylindrical section for receiving the motor in an enclosing manner. In this manner the motor is utilized for fixing the housing, preferably with a sound/vibration absorbing layer in between. The housing can additionally be fixed so that it encloses and lies up against the outer tube and rear mounting in the dividing line. Further, the housing can be equipped with internal flanges for additionally fixing of this on the console.

A particular simple fixing of the outer tube is achieved by an enclosing opening in the console for axial insertion of one end of the outer tube. The outer tube is thereby fixed in a sideways direction. An axial fixing can be achieved by at least one into an opening in the outer tube inwards projecting pin or cam, preferably shaped on the end of a spring-leg. In order to ease the insertion of the outer tube the pin(s) is for this purpose shaped on a clamp, which can be slid in over the section with the enclosing opening. For fixing the clamp, its outer ends and the section are equipped with corresponding snap locking clips. Accordingly the outer tube can without resistance be inserted in the opening and subsequently locked with the clamp.

In an embodiment of the actuator the rear mounting is a separate part of the housing and receives the bearing. This has assembly advantages at the same time as the distance between the bearing and the rear mounting becomes quite short. The transferring of forces between the bearing and the mounting becomes therefore almost direct. By forming the rear mounting in two parts with a recess for receiving the bearing, this is directly fixed in the longitudinally direction.

It is desirable being able to adjust the angle of the rear mounting to the construction in which the actuator should to be built into. This can be done in different ways, e.g. with a polygon shaped cross section, spline connection etc. In a preferred embodiment the rear mounting is designed with a cylindrical section to be received in a corresponding cylindrical opening in the console, and that the rear mounting has at least one projecting flange to be fitted into an indentation in the console, such that the rear mounting can be turned according to wishes.

To fix the outer end of the actuation rod to the construction into which the actuator is to be built, the rod can be supplied with different fittings, such as an eye, fork fitting or similar. The eye can simply be made in the actuation rod and with a bearing surface constituted of a raised rim of the eye into the hollow of the actuation rod. The end of the tube shaped rod can then be closed with a plug.

The known actuators are normally furnished with a fixed cable one end of which via a damp or waterproof is lead in is introduced into the housing. That is to say that one in advance should know the desired length of the cable alternatively furnish the actuators with a standard cable length and then either shorten or extend the cable after demand. In such case it is advantageous to design the housing with a well, which is in connection with a socket inside the actuator. In this manner the actuator can be supplied with the desired length of cable, also the cable is easily exchanged. The plug on the end of the cable can be furnished with an O-ring for damp and waterproof tightening against the side walls of the well.

In an embodiment of the actuator this can be equipped with a control box designed to be fitted in the angle between the section of the housing over the motor and the outer tube, and where the end of the control box, which faces the housing has a shape which corresponds to this and can be attached hereto by ribs on the housing being received in corresponding grooves on the control box and where the control box can be fixed to the outer tube with a clamp. Typically the control box contains the controlling electronics and a power supply based on a transformer, i.e. the box can be quite heavy. When this in spite of the actuators relatively weak housing, nevertheless is possible to fit the control box to the housing, this is due to that the motor supports the relevant sections of the housing and that the outer tube is embedded in the console.

The actuator can also be equipped with a quick release function, e.g., of the type specified in EP 0 685 662. The quick release function is used, e.g., in actuators for hospital beds where the mattress bearing-surface can be quickly lowered to the horizontal level.

BRIEF DESCRIPTION OF THE DRAWINGS

An embodiment of the invention will now be described in more detail with reference to the enclosed drawings, wherein:

FIG. 1 a perspective view of a preferred embodiment of actuator according to this invention, FIG. 2 is a longitudinal section of the actuator of FIG. 1 as seen along the line 2—2 therein, FIG. 2a depicts a detail of FIG. 2, FIG. 6 is a cross section of the outer tubes fixing, FIG. 7 is a perspective view of the front end of the outer tube, FIG. 8 is a perspective view of the end signal switches.

DETAILED DESCRIPTION OF THE PREFERRED EMBODIMENTS

Figure 3:
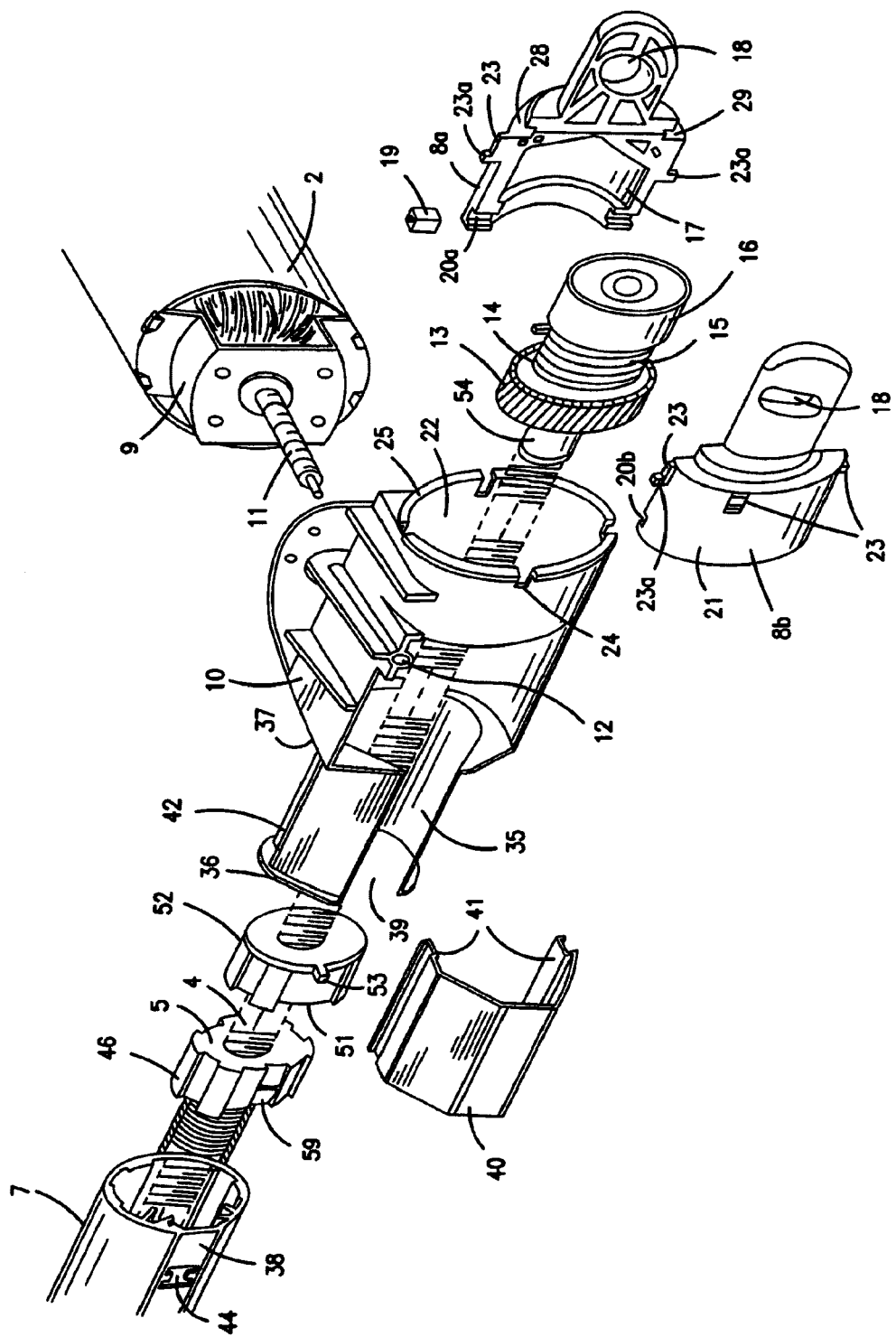
FIG. 3 is an exploded view of the elements inside its housing at the rear end of the actuator.
Figure 4:
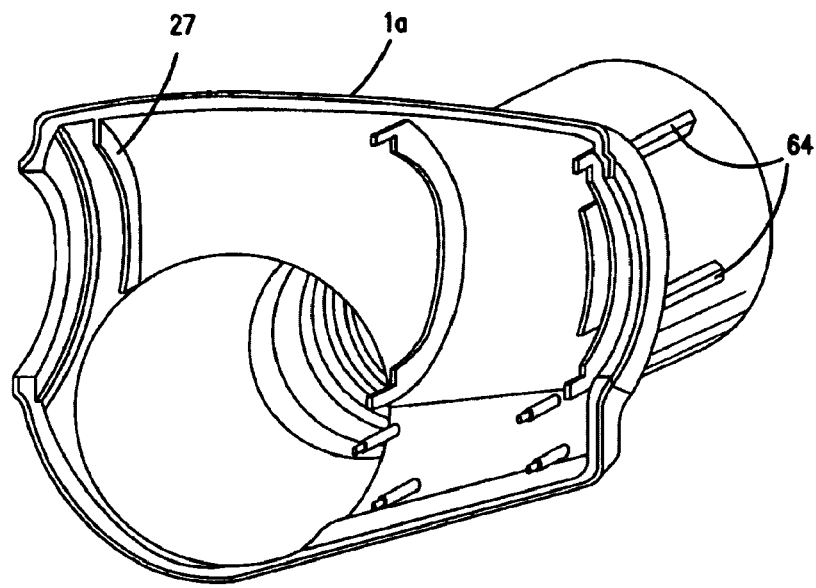
FIG. 4 is a perspective view of one part of the cabinet.
Figure 5:
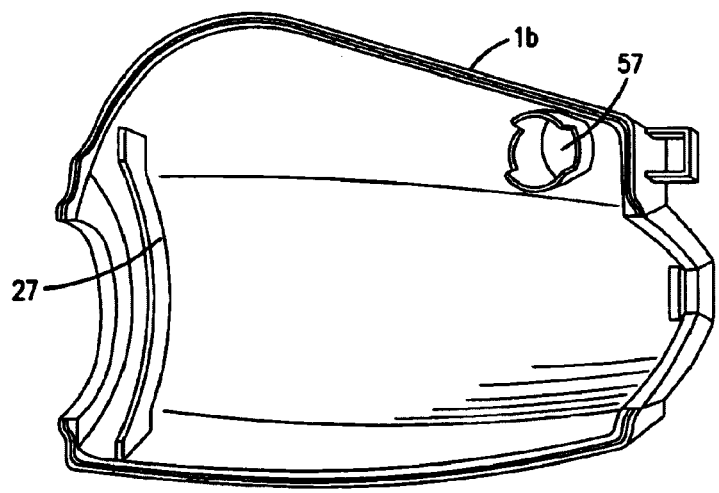
FIG. 5 is a perspective view of the other part of the cabinet.

As shown in the drawings the main parts of the actuator are constituted by a two-piece housing 1, a motor 2 inside a housing part 1a, a worm drive 11, a spindle 4, a spindle nut 5, an activation rod 6, an outer tube 7 and a rear mounting 8.

The motor 2 is a reversible electric motor, typically a 24V or 48V DC-motor. The motor has a front cover 9, onto which a console 10 is fitted. The motor axle has an extended part formed as a worm 11, the free end of which is bedded in a journal bearing 12 molded in the console.

At the rear end of the spindle 4, a worm wheel 13 is fitted which engages the worm 11. The worm wheel 13 has on one side a cylindrical element 14 onto which a coil spring 15 rests to increase the self locking ability of the spindle, cf. EP 0 662 573 Linak. Hereafter comes a ball bearing 16 which is held in place, shaping the end of the spindle as a rivet head.

The ball bearing 16 is encapsulated in a recess 17 in the rear mounting 8, which consisting of two halves 8a, 8b. The rear mounting 8 has an eye 18, alternatively a fork fitting, to fix the actuator in the construction into which it to be installed. One end of the coil spring is bent radially outwards and is held in a metal insert 19, which again is fixed in a recess in 20a, 20b in the dividing line between the two halves of the rear mounting 8a, 8b.

The rear mounting has a circular part 21, by means of which it is encased in a tube-shaped section 22 in the console. The circular part 21 has four bosses 23, which fit into corresponding slots 24 in the wall of the console. The rear mounting can therefore be turned depending on whether the eye 18 should turn one way or the other.

At the end of the console there is an exterior collar 25, and on the bosses 23 there are a radially-extending legs 23a such that there is a gap 26 between the collar and the legs. When the housing 1 is assembled, the rear mounting 8 is fixed by an internal flange 27 extending into the gap 26 and by doing so locks the rear mounting in the longitudinal direction. The rear mounting is additionally held in place by the end of the cabinet lying against a side wall 28 in a ledge on the rear mounting. On the ledge there is a groove 29, in which, for sealing purposes, an O-ring 30 is placed. When assembled the edge of the aperture in the cabinet seals against the O-ring.

The activation rod 6 consists of a tube fixed with the rear end to the spindle nut 5 with a fine pitch thread. Hereby the activation rod can be additionally fine adjusted, for optimal placement of the eye in relation to the construction. The front end of the actuation rod is closed with a close fitting plastic plug 31. The actuation rod is fixed by means of an eye 32 to the construction into which the actuator is to be installed. The eye has a bearing surface 33 in the form of the rim of the hole has been raised inside the hollow of the rod.

The outer tube 7 consists of an extruded aluminum tube with a non-circular cross section. In the outer end of the tube an end cover 34 is inserted having a circular hole for the actuation rod 6. The rear end of the outer tube is enclosed in a close fitting section 35 in the front end of the console. At the front, the section has an external collar 36 and at the rear a step 37. The outer tube has a flat upper side 38 and the enclosing section a corresponding lengthwise aperture 39.

A clamp 40 can be pushed onto the section 35, said clamp lying over the aperture 39, while its legs grips around the sides of the section. The clamp is held in place in the longitudinal direction between the collar 36 and the side of the step 37. The clamp locks with snap lock means, namely by an internal protruding edge 41 on the lower end of its legs co-operating with an inwards edge 42 on the sidewall of the section 35. On the top of the clamp there are two taps 43, which, when the clamp is pushed in place, are introduced into corresponding holes 44 on the upper side of the outer tube 38. The clamp locks the enclosing section, such that the outer tube is fixed both in the sideways and the longitudinal direction. The fixing positions at the same time the outer tube in the lengthwise direction.

On the inside of the outer tube there are four grooves 45 for preventing the spindle nut 5 against rotation, as the nut has four corresponding external cams 46 on a collar, which fits into the grooves. In the tube there are two further grooves 47 positioned opposite each other for insertion of an elongated print-board 48, which has a signal switch 49 at each end, which are activated by a spring arm 50 fitted on a seat in connection with the switch. When the spindle nut reaches an end position, it will press the spring arm against the switch, which is then activated and via the control stops the motor. For this purpose the nut is having two opposite facing bevelled surfaces 59. In the rear end of the outer tube there is a plug 51 with edges which fit into the grooves in the outer tube and the plug ends in a circular flange 52, which rests against the end of the tube. On this flange there is a radially-extending tap 53, which fits into a corresponding notch at the end of the print board 48, and thereby fixing this in the longitudinal direction. Thereby are the end positions of the actuator determined.

It should be noticed that the forward face of the worm wheel 13 has a tube-shaped portion 54, which is seated in a hole in the end plug 51. This supports and stabilizes the axes of the worm wheel and also the end of the spindle.

With regard to sealing an O-ring 55 is placed around the outer tube. The O-ring lies in a groove defined by an edge in an aperture in the housing for the outer tube, the upper side of this and the outer side of the collar 36 on the console.

The assembly of the actuator takes place as described or mainly as described above. The last step is the assembly of the housing, which consists of two parts 1a, 1b, divided on a plane through the axis of the spindle and at an right angle to the motor axle. The part 1a has a cup-shaped section to receive the motor and a bowl-shaped section to receive one of the halves of the console. There are also four upright pins, holding a small print board 55 with a male plug 56. From the print board supply leads runs to the motor and connections for the signal leads from the end signal switches. In the other part of the housing 1b, which is bowl shaped and contains the other section of the console, there is a well 57, which leads to the male connection. The well is designed to receive a female connector 67 fitted with a sealing ring. For strain relief of the connection cable this is lead through a clamp 58 designed for this purpose and located on the cabinet part 1b.

Figure 9:
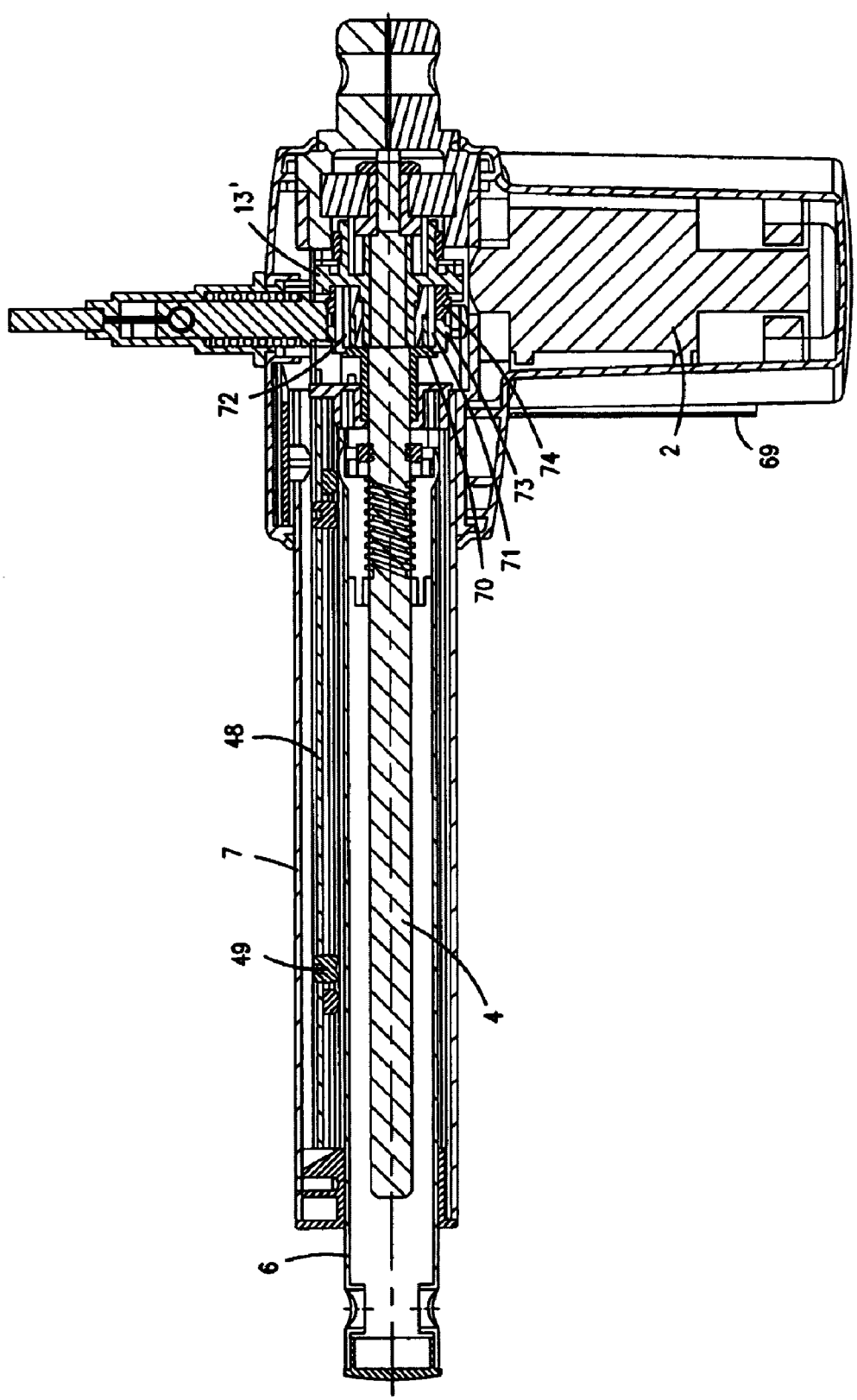
FIG. 9 is a longitudinal section through an embodiment part of the actuator equipped with a quick release function.

An embodiment of the actuator having a quick release function is described in the following with reference to FIGS. 9 and 10 in the drawing.

The quick release function comprises two clutch parts 70, 71, where one part 70 is fitted permanently to the spindle, whilst the other part 71 is fixed to the worm wheel 13 of the worm gear. More precisely, the side of the worm wheel facing the front end of the actuator is constructed with a cylindrical section, upon which a bushing with a corbie-step is fixed. The clutch part 70 on the spindle is constructed with a bowl, which sits over this corbie-step. Around the two parts 70, 71 a clutch spring 72 is fitted, which lies between the side of the worm wheel and a collar on the clutch part 71. During normal operation the spring 72 couples the two clutch parts 70, 71 together, such that the spindle 4 via the worm gear is connected to the motor 2.

Figure 11:
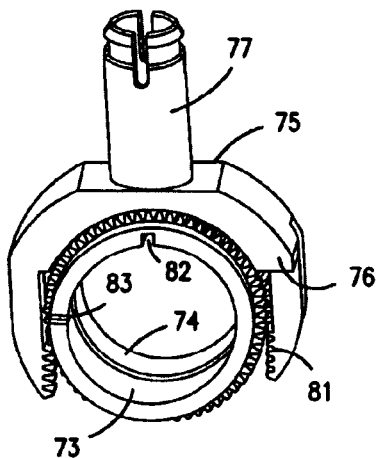
FIG. 11 is the release for the quick release function.

Around the clutch spring 72 there are two cylindrical elements 73, 74 designed with an exterior toothing. The ends 72 of the clutch spring are bent radially outwards and are embedded in separated elements, that is in notches 82, 83 cp. FIG. 11. Notch 82 leads into element 74.

A Y-formed release 75 rides with its legs over the two cylindrical elements 73, 74 such that one leg is opposite to one element, whilst the other leg 76 is opposite the other element 74. The upper stretch of the legs are smooth, whilst a lower stretch is having a toothing to fit the toothing on the elements 73, 74.

The neck 77 of the Y-formed release 75 is controlled in a sleeve 78 fixed to the housing On the neck there is a spring 79, which tightens between a shoulder in the opening of the sleeve and the upper side of the release such that, the release is spring loaded in a parking position, where the lowest, toothed part of the legs are out of contact with the two cylindrical elements 73, 74. To the top end of the neck there is fixed a cable 80 connected to a operating handle not shown.

Figure 10:
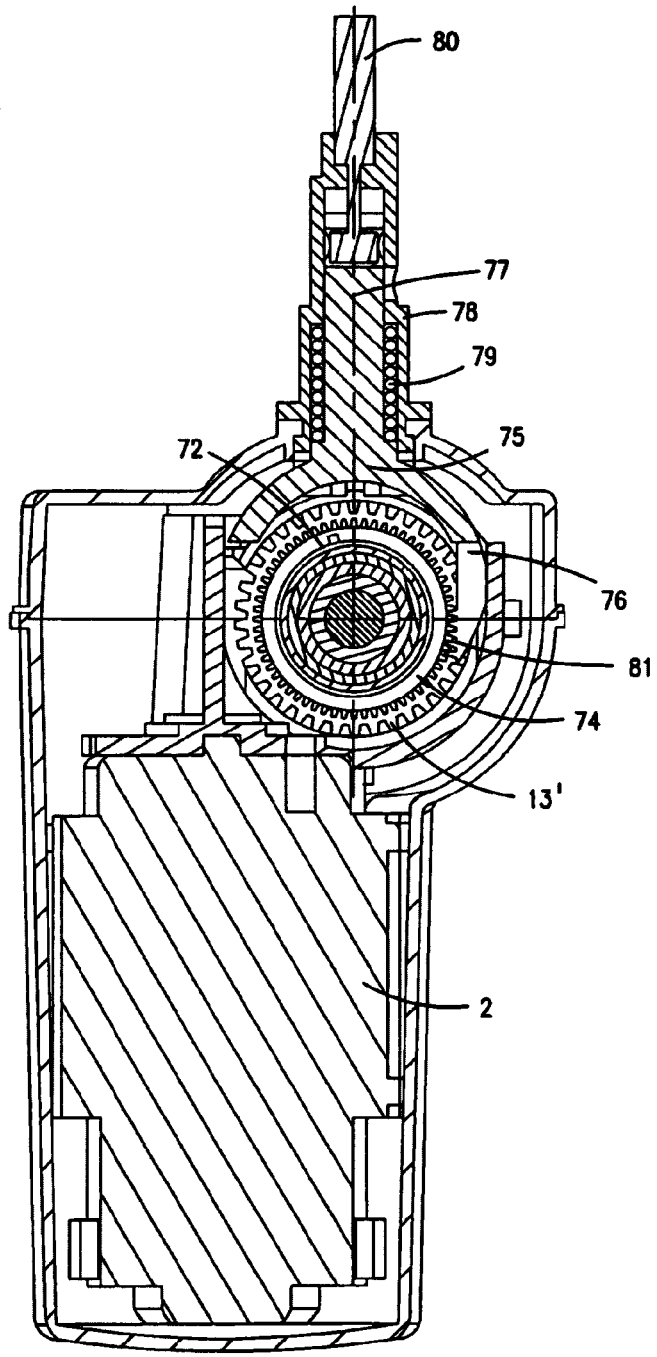
FIG. 10 is a cross section through an embodiment in FIG. 9.

When the handle is pulled the release is pulled up as shown in FIG. 10 until the lower part 81 of the legs contacts the respective cylindrical elements 73, 74 which then is turned opposite each other. The ends of the spring will then be pulled from each other, one clockwise and the other counterclockwise. In this way the spring will expand, i.e., its internal diameter will increase and the two clutch parts 73, 74 are then released. The spindle will then be released and can rotate freely. If the activation rod 6 is under load and if it is in an extended position, it will then be pushed inwards, depending on the load being able to overcome self locking ability of the spindle. In FIG. 10 the release is shown in its operative position, whilst in FIG. 11 it is shown in its inactive position. That only one leg is shown on the release in FIG. 10, is due to the cross section.

Figure 12B:
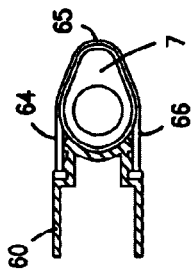
FIG. 12 is a perspective view of the actuator equipped with a control box.
Figure 12:
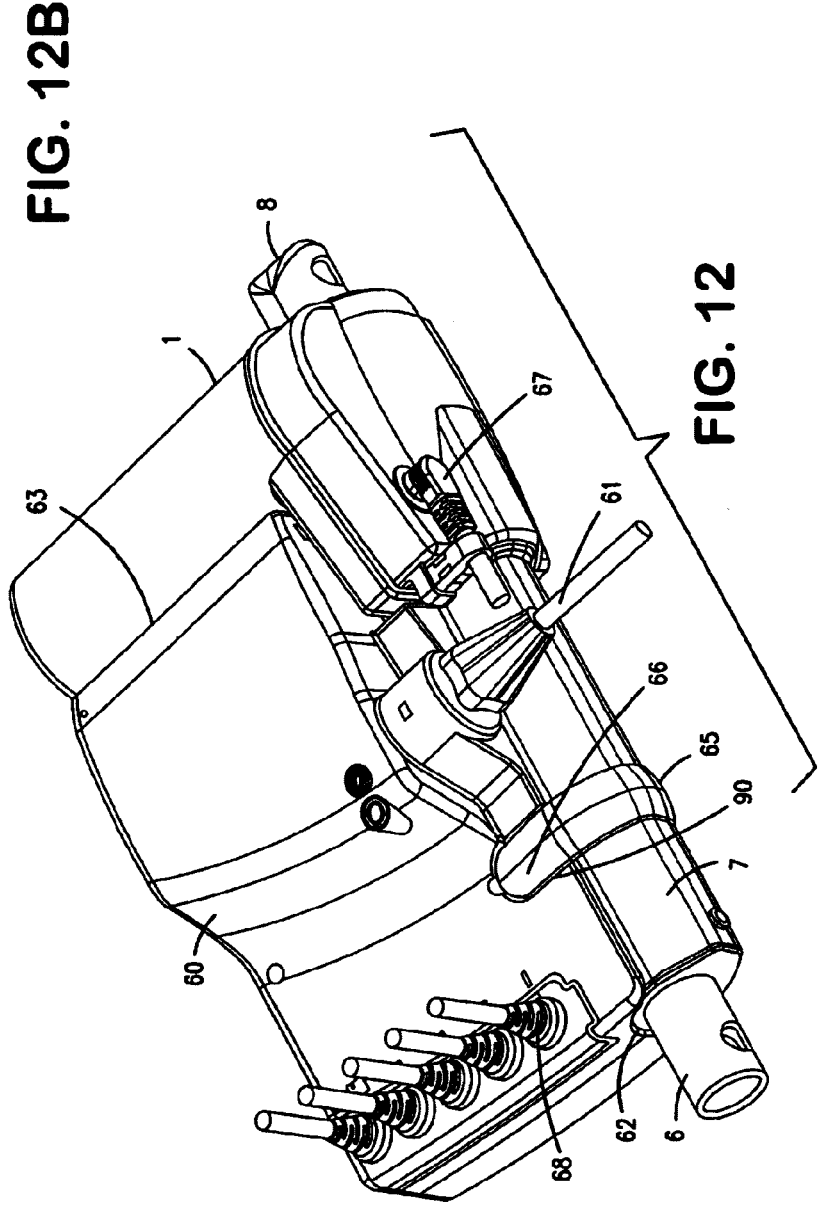
Figure 12A:
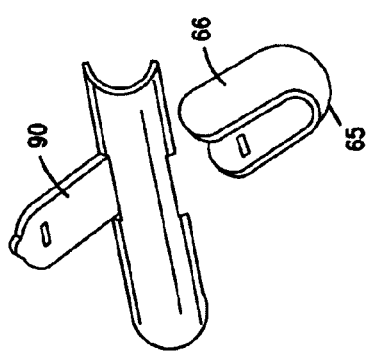

As shown in FIG. 12, the actuator can be fitted with a control box 60 containing control electronics and power supply and 61 shows the mains cable. A long side of the control box is concave 62 to receive and enclose one side of the outer tube. An end 63 is also concave to receive and enclose one side of the cylindrical part of the housing, which contains the motor. On this side of the housing there are two parallel ribs 64 having an L-shaped cross section, which couples with corresponding grooves in the end of the housing. The control box is fitted by guiding the end of the box along the housing of the actuator, such that the ribs 64 connect with the grooves and along until the long side grips around the outer tube. Finally the control box is locked to the outer tube with an U-shaped clamp 65, which is guided sideways across the outer tube, and which with clasp-locks on the inner side of the legs 66 of the clamp couples with clasp locks on the over and underside of the control box. The ends of the legs are fitted into a recess 90 designed for this on the cabinets upper and under side. The cable 67 from the actuator is connected with one of the sockets 68 of the control box and other actuators and a handset can be connected to the other sockets.

According to he invention there is thus provided a linear actuator which enables lower production costs and at the same time the actuator can maintain a high quality, strength and flexibility with regard to accessories and fittings (front and rear mountings).

What is claimed is:

1. A linear actuator for moving first and second elements of a construction relative to one another, said linear actuator comprising:
   a housing provided by a first housing part and a second housing part, said housing defining a front end and a rear end,
   a console located in said second housing part, said console providing a journal bearing and defining a front end and a rear end,
   a reversible electric motor positioned in said first housing part and connected to said console,
   a worm which extends into said journal bearing and connects with a worm wheel, said worm being driven by said electric motor,
   an outer tuber which is connected to a front end of said console and extends through an opening in the front end of said housing to a free end spaced forwardly of the front end of said housing,
   an activation rod which extends from within said housing through and beyond the free end of said outer tube to an end providing a first fitting for connection to one of said first and second elements to be moved relative to one another, said activation rod being telescopically movable relative to said outer tube,
   a spindle nut connected to said activation rod,
   a spindle bearing supported by said rear end of said console,
   a spindle which is mounted in said spindle bearing and extends through said console and through said spindle nut, rotation of said worm wheel by said electric motor causing said spindle to rotate and, via said spindle nut, telescopically move said activation rod relative to said outer tube,
   a rear mounting which is connected to said rear end of said console and extends through an opening in the rear end of said housing, said rear mounting including a fitting for connection to another of said first and second elements to be moved relative to one another, and
   said console absorbing forces occurring on the outer tube and the rear mounting.

2. A linear actuator according to claim 1, wherein said console includes a fitting section at its front end, and wherein a rear end of said outer tube extends within said fitting section.

3. A linear actuator according to claim 2, wherein said outer tube defines an opening therein, and including an inwardly-extending tap which extends through said opening in said outer tube to fix said outer tube within the fitting section.

4. A linear actuator according to claim 3, including a clamp which extends around said fitting section, said clamp including said inwardly-extending tap which extends through an aperture in said fitting section.

5. A linear actuator according to claim 1, wherein said rear mounting is separate from the console, and wherein said spindle bearing is contained within the rear mounting.

6. A linear actuator according to claim 5, wherein said rear mounting is formed of two cooperating elements.

7. A linear actuator according to claim 5, wherein the rear end of the console defines a cylindrical opening, wherein the rear mounting defines a cylindrical section which fits within said cylindrical opening, and wherein the cylindrical section includes an outwardly-extending flange that fits within a notch of said cylindrical section of said console so that said console and said rear mounting will rotate in unison.

8. A linear actuator according to claim 1, wherein said first fitting at the end of said activation rod comprises an eye that extends through the actuation rod, said eye having a raised rim at its opposite ends.

9. A linear actuator according to claim 1, including a circuit board within the housing for the motor, said circuit board including a male plug, and wherein said housing defines a well through which a female plug of an electrical line can be extended to connect with said male plug.

10. A linear actuator according to claim 1, wherein said spindle defines a longitudinal axis and wherein said first and second housing parts interengage along a plane which contains said longitudinal axis, said electric motor having a drive shaft that extends perpendicular to said plane.

11. A linear actuator according to claim 1, including a quick release comprising two cylindrical clutch parts surrounded by a clutch spring having outward bent ends, said ends being connected with its respective cylindrical element, seated under normal circumstances to take part in the rotation of the clutch, and where the two cylindrical elements with a release are fitted to enable them to impart a mutual rotation to turn the ends of the spring away from each other such that, the spring is released from at least one of the clutch parts for complete or partly release from the clutch, and where the two cylindrical elements have an exterior toothing, and the release has a corresponding toothing, which can be brought to mesh and thereby to a mutual turning of the elements.

12. A linear actuator according to claim 1, including a control box for fixing an angle between the housing part sitting over the motor and the outer tube, where the control box end, which faces the housing, has a corresponding shape and can be fixed hereto with ribs on the housing, said ribs being received in corresponding grooves on the control box, and where the control box with a clamp can be fixed to the outer tube.

* * * * *